US006311989B1

(12) United States Patent
Rosanwo

(10) Patent No.: US 6,311,989 B1
(45) Date of Patent: Nov. 6, 2001

(54) CHUCK FOR SCREWDRIVER INSERTS

(76) Inventor: Sylvester Rosanwo, Plantanenstrasse 6, D-42119 Wuppertal (DE)

( * ) Notice: Subject to any disclaimer, the term of this patent is extended or adjusted under 35 U.S.C. 154(b) by 0 days.

(21) Appl. No.: 09/612,927

(22) Filed: Jul. 10, 2000

(30) Foreign Application Priority Data

Jul. 13, 1999 (DE) .......................................... 199 32 369

(51) Int. Cl.[7] .............................................. B23B 37/107
(52) U.S. Cl. .......................................... 279/75; 279/905
(58) Field of Search ............................... 279/22, 30, 74, 279/75, 82, 905

(56) References Cited

U.S. PATENT DOCUMENTS

| | | | | |
|---|---|---|---|---|
| 3,091,473 | * | 5/1963 | Bilz | 279/75 |
| 4,828,277 | * | 5/1989 | De Bastiani et al. | 279/1 SG |
| 5,934,846 | * | 8/1999 | Ishii | 408/141 |
| 6,059,296 | * | 5/2000 | Baeder | 279/20 |
| 6,092,814 | * | 7/2000 | Kageler | 279/19.4 |

* cited by examiner

*Primary Examiner*—Daniel W. Howell
*Assistant Examiner*—Terrence Washington
(74) *Attorney, Agent, or Firm*—Martin A. Farber

(57) ABSTRACT

A chuck for screwdriver inserts (20), having an insertion cavity (8) of a bush (5), the insertion cavity (8) being adapted in cross section to the polygonal section of the insertion shank (23) of the bit, windows (16) opposite one another in the corner region of the insertion cavity (8) being located in the bush (5), and round clamping bodies (19, 19') lying in said windows (16) on supporting shoulders (18), the diameter of which clamping bodies (19, 19') is greater than the window wall thickness and which are loaded inward toward the cavity by an inclined surface (14) of a spring-loaded actuating sleeve (9) and press in point contact against the corner of a corner recess of the insertion shank (23). In order to hold an enlarged range of bits captive in the insertion cavity (8), the invention proposes that be offset from one another in the axial direction in such a way that, in the case of a corner recess in the form of an annular flute (25), the rear clamping body (19') sits on the corner (E), and the front clamping body (19), lying on the supporting shoulders (18), projects freely into the annular flute (25), and, in the case of a corner recess in the form of a prismatic notch or in the form of a bevel, the front clamping body (19) sits on the corner and the rear clamping body (19') bears against an edge of the shank polygon.

3 Claims, 4 Drawing Sheets

CHUCK FOR SCREWDRIVER INSERTS

FIELD AND BACKGROUND OF THE INVENTION

The invention relates to a chuck for screwdriver inserts, having an insertion cavity of a bush, the insertion cavity being adapted in cross section to the polygonal section of the insertion shank of the bit, windows opposite one another in the corner region of the insertion cavity being located in the bush, and round clamping bodies lying in said windows on supporting shoulders, the diameter of which clamping bodies is greater than the window wall thickness and which are loaded inward toward the cavity by an inclined surface of a spring-loaded actuating sleeve and press in point contact against the corner of a corner recess of the insertion shank.

In such known chucks on the market, the bush has round clamping bodies in opposite windows in the corner region of the insertion cavity, the clamping bodies being arranged in the same cross-sectional plane. These clamping bodies act jointly on the corner recesses of the insertion shank.

SUMMARY OF THE INVENTION

The subject matter of the invention, is based on the object of developing a chuck of the introductory-mentioned type in such a way that an expanded range of bits can be held captive in the insertion cavity of the bush.

This object is first of all and essentially achieved in a chuck wherein the two clamping bodies are offset from one another in the axial direction in such a way that, in the case of a corner recess in the form of an annular flute, the rear clamping body sits on the corner, and the front clamping body, lying on the supporting shoulders, projects freely into the annular flute, and, in the case of a corner recess in the form of a prismatic notch or in the form of a bevel, the front clamping body sits on the corner and the rear clamping body bears against an edge of the shank polygon.

As a result of such a configuration, a chuck of the type in question having an increased range of use is created. On account of the clamping bodies offset from one another in the axial direction, it is now possible for three screwdriver bits formed differently with regard to their insertion shank to be assigned to a single chuck. On the one hand, the screwdriver bits can be formed in such a way that they form an annular flute on the insertion shank. The rear clamping body, as viewed in the insertion direction of the screwdriver bit, then acts against the corner of the annular flute, while the front clamping body projects freely into the annular flute and exerts no clamping action there. The front clamping body is supported by supporting shoulders of the bush, which are located in front of the windows. Screwdriver bits in which the corner recesses are formed by prismatic notches on the insertion shank can then be used. While the front clamping body sits on the corner, the rear clamping body is supported on the relevant edge of the shank polygon. This likewise applies to screwdriver bits in which the corner recess is formed by a bevel which results as a transition surface from the polygonal section to a stepped section of round cross section. With all the different screwdriver inserts, stable seating in the insertion position is realized. Only a single chuck is required for three screwdriver inserts of different configuration, so that this leads to a saving in tools. In this case, the invention makes use of the fact that there are standards with regard to the relevant corner recesses, so that, if there is an appropriate distance between the two clamping bodies, as viewed in the axial direction of the polygonal section of the insertion shank, one of the clamping bodies is always seated in an interlocking manner relative to the corner recess in accordance with the specifications. An advantageous development, according to the invention, consists in the fact that both clamping bodies are subjected to pressure in the radial direction by the facing inclined surfaces of the actuating sleeve. Accordingly, the two clamping bodies are acted upon radially by means of one and the same actuating sleeve, so that these clamping bodies can assume their respective corresponding position in accordance with the intended purpose. Finally, an advantageous feature also consists in the fact that the clamping bodies are formed as balls. Accordingly, components which can be produced cost-effectively may be used for the chuck according to the invention.

BRIEF DESCRIPTION OF THE DRAWINGS

An exemplary embodiment of the invention is explained below with reference to the drawings, in which.

DETAILED DESCRIPTION OF THE PREFERRED EMBODIMENT

Figure 1:
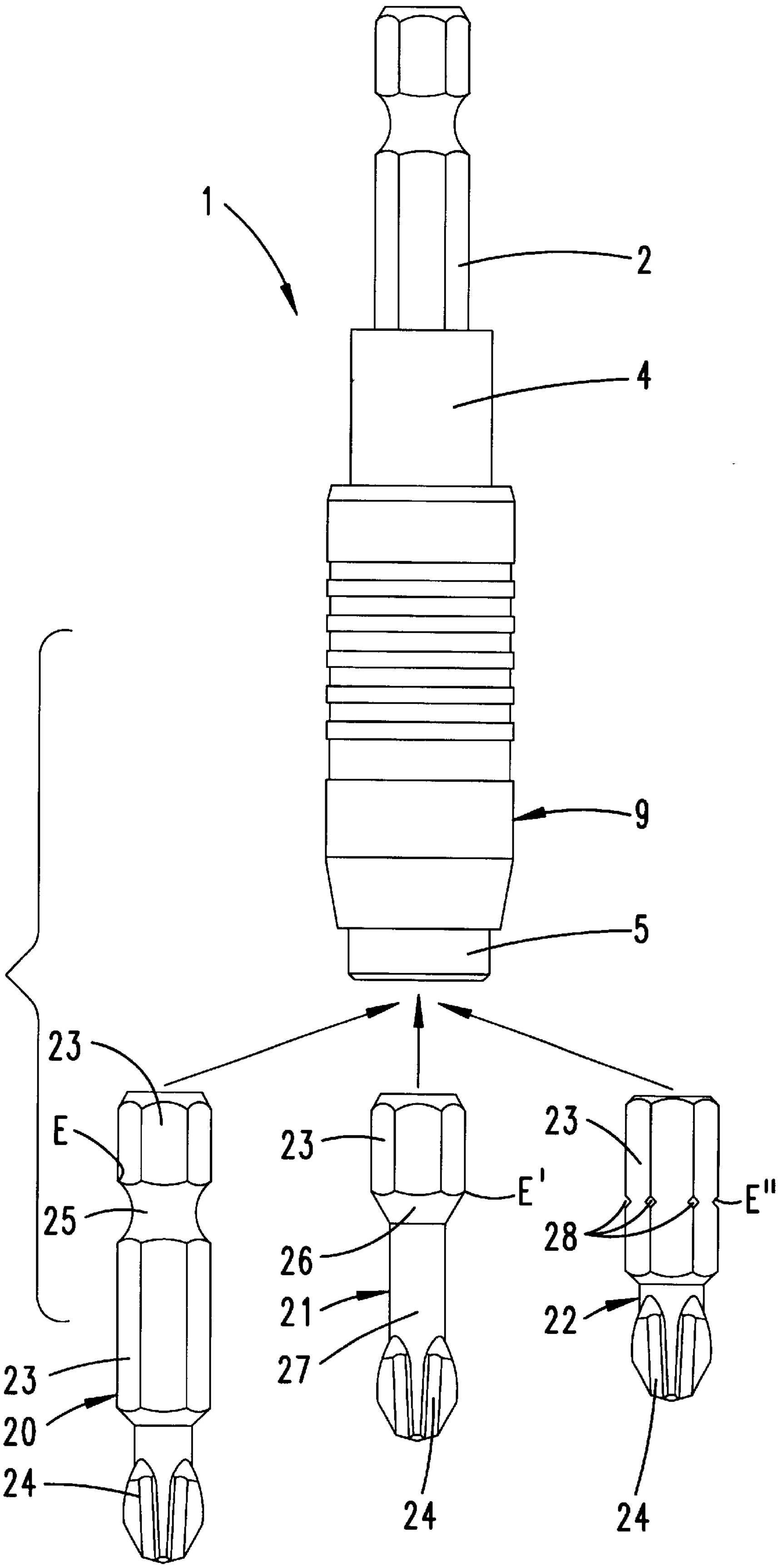
FIG. 1 shows a view of the chuck according to the invention with three screwdriver inserts of different configuration, specifically with regard to the corner recesses on the insertion shank.

The chuck shown is designated overall by the numeral 1. It has a polygonal, in particular hexagonal, clamping section 2, which is formed as a torsion rod and by means of which the chuck can be clamped in a drive member, for example a drilling machine. The end 2' opposite the clamping end of the clamping section 2 passes through a drive sleeve 4 and projects into a hexagonal cavity 3 of a bush 5. The relevant insertion end 2' is anchored in the hexagonal cavity 3 there in a suitable manner. Following the hexagonal cavity 3, the bush 5 accommodates a permanent magnet 7 in a cavity section 6, and that end face of the permanent magnet 7 which is remote from the insertion end 2' projects slightly into an insertion cavity 8 of the bush 5. The insertion cavity 8 starts from the free end face of the bush 5, which is provided with a circular circumferential surface. The outside diameter of the bush 5 corresponds to that of the drive sleeve 4.

An actuating sleeve 9 is guided on the drive sleeve 4 and bush 5 in a longitudinally displaceable manner. It is under the effect of a compression spring 10. One end of the compression spring 10 is supported on a snap ring 11 partly let into the bush 5, while the other end of the compression spring 10 is set against a radial shoulder 12 of the actuating sleeve 9. The radial shoulder 12 is formed by a supporting sleeve 13 firmly connected to the actuating sleeve 9 and sliding directly on the bush 5 and drive sleeve 4. As a result, the actuating sleeve 9 is loaded in the insertion direction of a screwdriver insert. The displacement of the actuating sleeve 9 is limited by an annular step 15 adjoining the inner inclined surface 14 of the actuating sleeve 9. In this case, the inclined surface 14 extends up to the outer circumference of the bush 5. For example, the inclined surface 14 may be produced by shaping the corresponding wall region of the actuating sleeve 9.

At the level of the inclined surface 14 of the actuating sleeve 9, the bush 5 has two windows 16 opposite one another in the corner region of the insertion cavity 8. The windows 16 are formed by radial bores 17 of the bush 5, which radial bores 17 form conically running supporting shoulders 18 close to the insertion cavity 8. Round clamping bodies 19, 19' lie in the radial bores 17. These clamping bodies 19, 19' are shaped as balls and are subjected to pressure in the radial direction by the inclined surface 14, assigned to them, of the actuating sleeve 9. The diameter of the balls is greater than the window wall thickness.

As can be seen from the longitudinal sections of the drawings, the clamping bodies 19, 19' are offset from one another in the axial direction. The corresponding offset is designated by x. The offset x is selected to be so large that screwdriver inserts 20, 21, 22 of different configuration can be inserted. Each screwdriver insert 20 to 22 has an insertion shank 23 which is hexagonal in cross section and is adapted in shape to the cross section of the insertion cavity 8.

Adjoining the insertion shank 23 is the working end 24 of the screwdriver insert. As is generally known, the working end 24 can be adapted to the respective screw.

Figure 2:
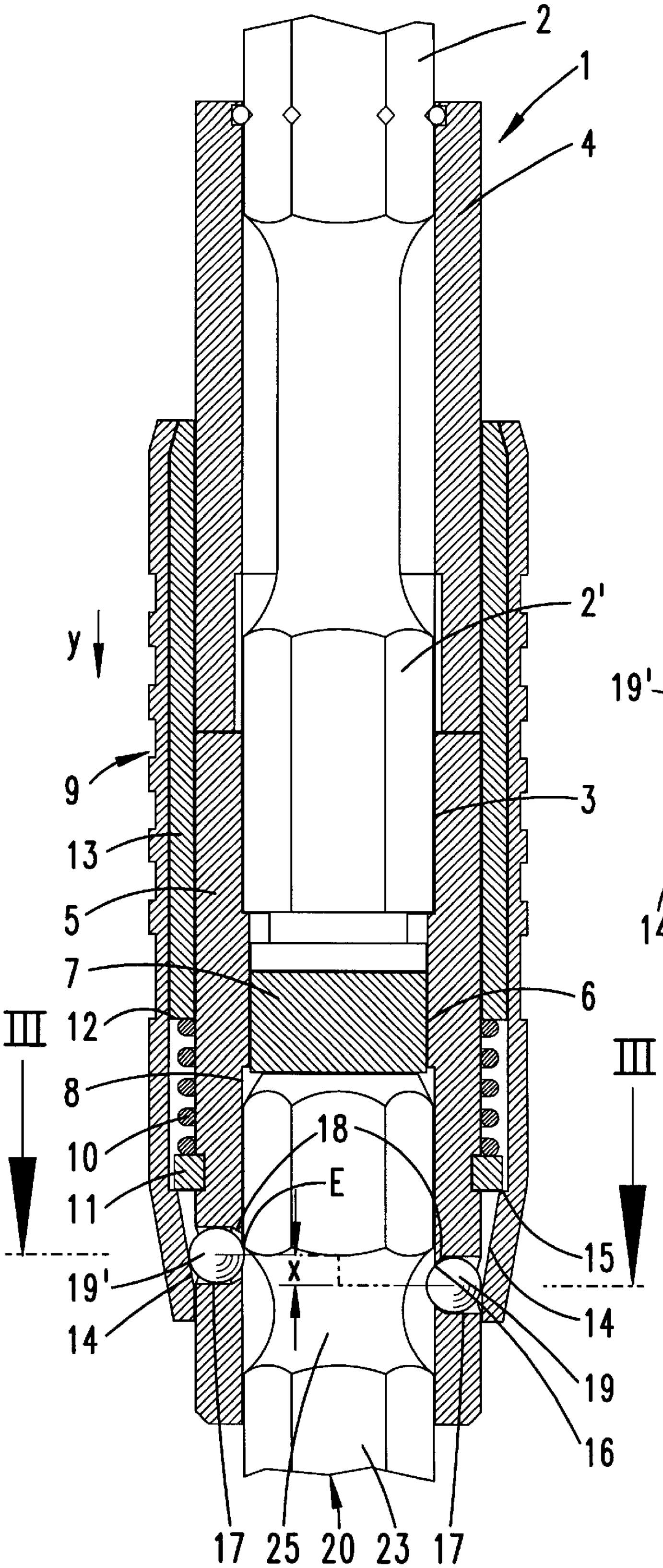
FIG. 2 shows a longitudinal section in an enlarged representation through the chuck with screwdriver insert in place, having an annular flute located on the insertion shank.
Figure 3:
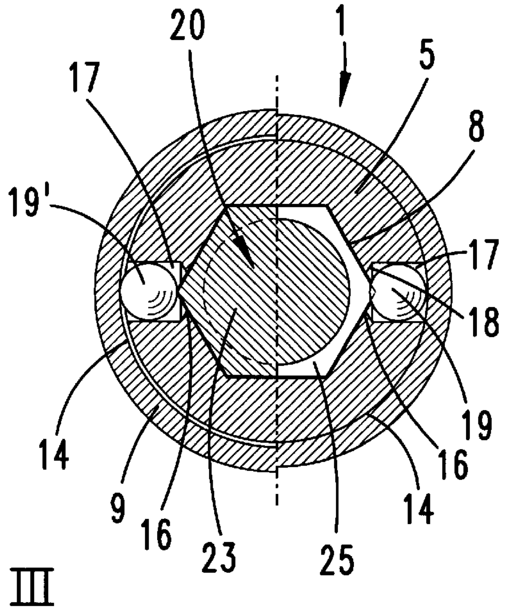
FIG. 3 shows the section along line III—III in FIG. 2.

The screwdriver insert 20 introduced according to FIGS. 2 and 3 into the insertion cavity 8 of the bush 5 has an encircling annular flute 25 on its insertion shank 23.

In the inserted position of the screwdriver insert 20, the rear clamping body 19', as viewed in the insertion direction of the screwdriver insert 20, sits on the corner E. The corner E is formed on the run-out region of the annular flute 25 and the adjoining edge of the polygon of the insertion shank 23. As a result, a force component is exerted on the screwdriver insert 20 in the insertion direction in such a way that, in the exemplary embodiment shown according to FIGS. 2 and 3, the insertion-side end face of the insertion shank 23 is set against the permanent magnet 7 and is additionally fixed in position by the latter. On the other hand, the front clamping body 19 rests on the supporting shoulder 18 and projects freely into the annular flute 25. The clamping bodies 19, 19' are each held by the inclined surface 14, facing them, of the actuating sleeve 9.

Figure 4:
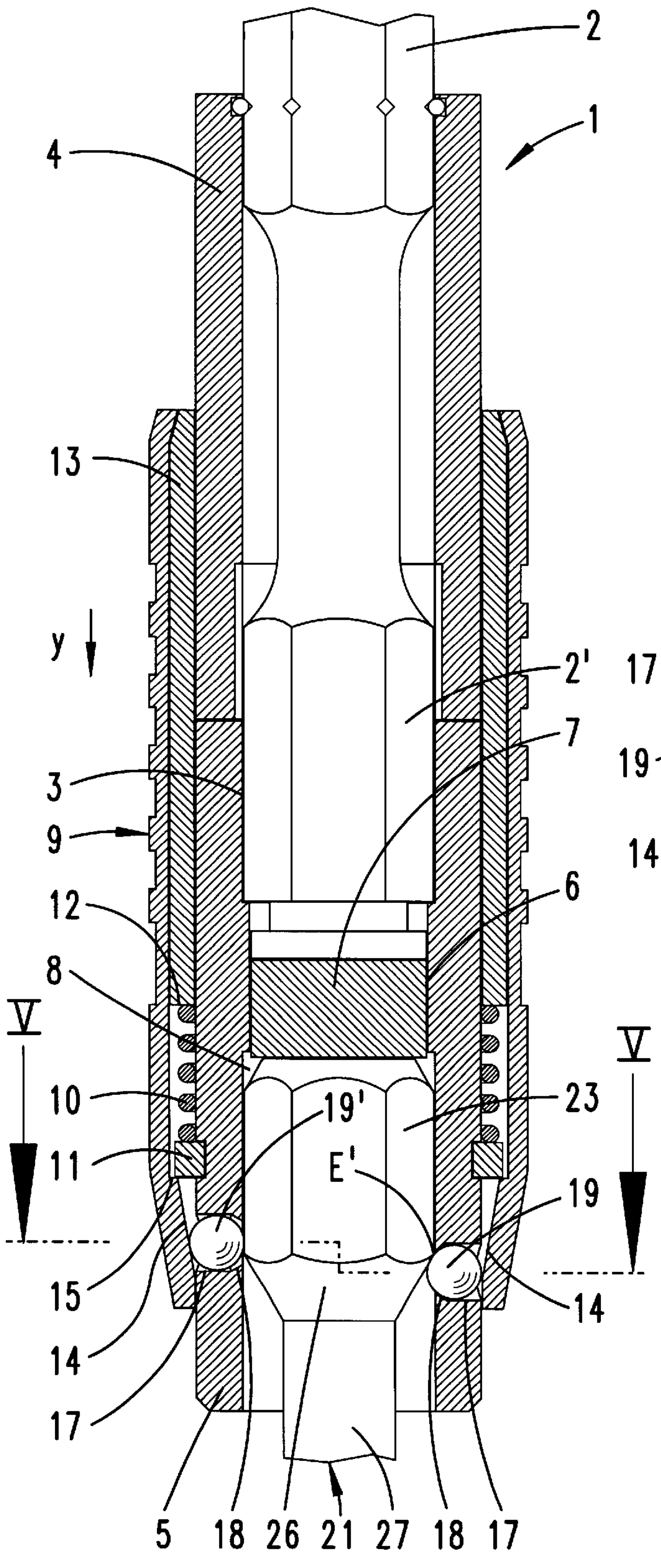
FIG. 4 shows a longitudinal section through the chuck with the screwdriver insert, in which the corner recess is formed by a bevel of the insertion shank.
Figure 5:
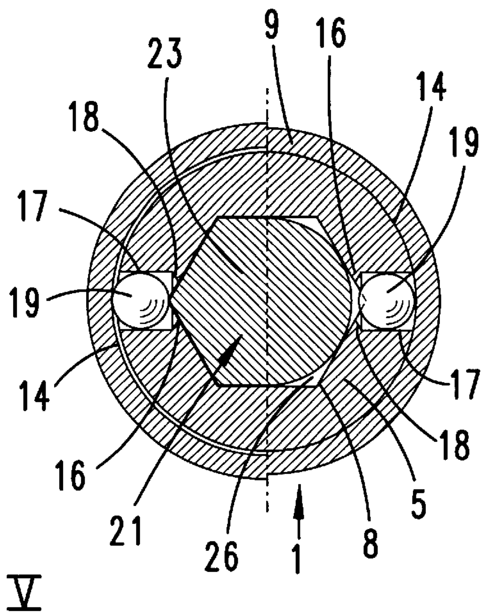
FIG. 5 shows the section in this respect along line V—V in FIG. 4.

The screwdriver insert 21 is used according to FIGS. 4 and 5. Its insertion shank 23 merges via a bevel 26 into a rounded section 27 of small cross section, adjoining which is the working end 24. If this screwdriver insert 21 is inserted, the rear clamping body 19' bears against a corner of the shank polygon, while the front clamping body 19 sits on the corner E'. The corner E' is formed on the bevel 26 in combination with the relevant edge of the shank polygon. In this case, the clamping body 19 exerts a force component in the insertion direction on the screwdriver insert 21, the insertion-side end face of which is in a position bearing against the permanent magnet 7.

Figure 6:
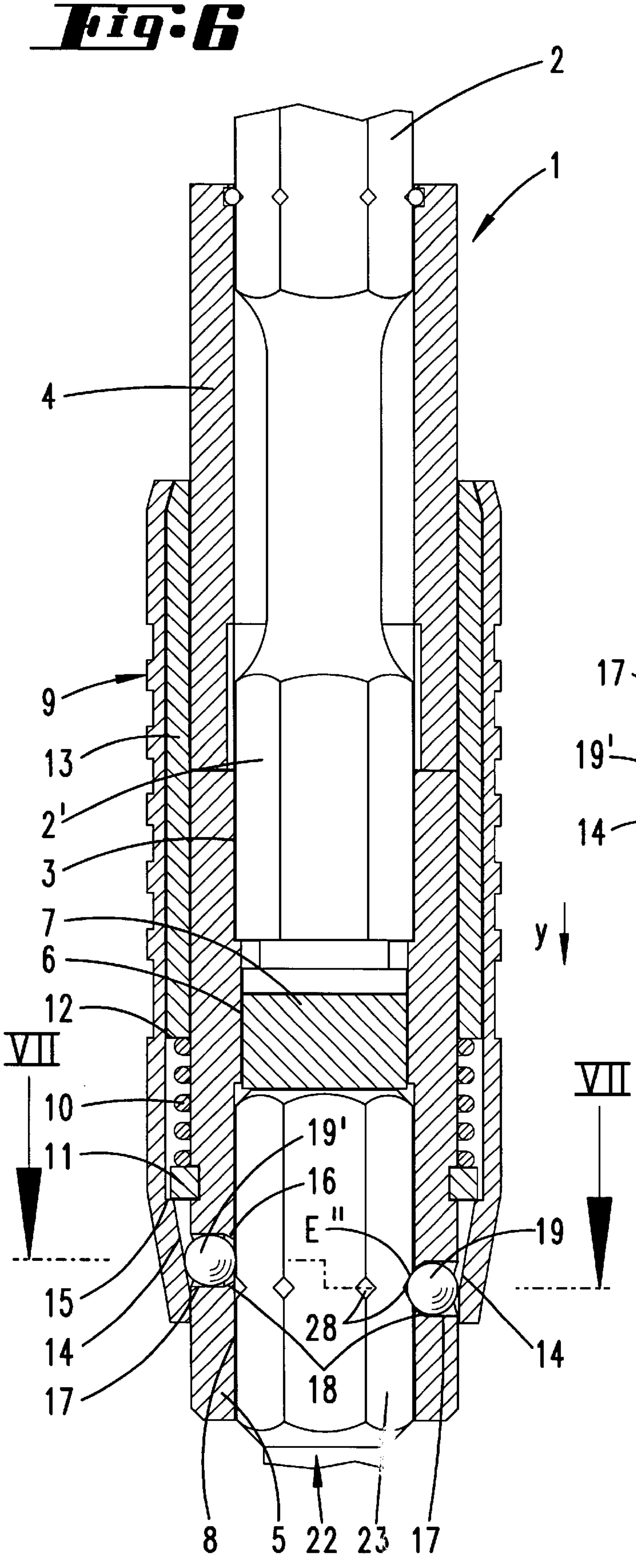
FIG. 6 shows a longitudinal section through the chuck with the screwdriver insert, in which the insertion shank forms the corner recesses in the form of prismatic notches on the edges of the shank polygon.
Figure 7:
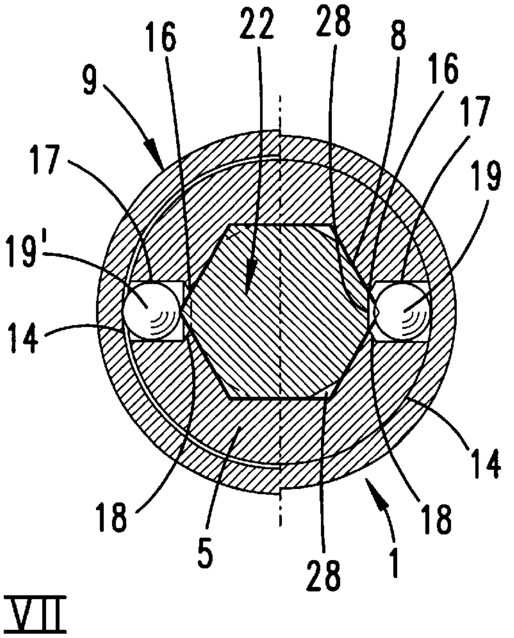
FIG. 7 shows the section along line VII—VII in FIG. 6.

According to FIGS. 6 and 7, the chuck 1 accommodates the screwdriver insert 22. The insertion shank 23 of the latter has prismatic notches 28 in the region of the edges of its shank polygon, the notches 28 extending in the same cross-sectional plane. In this case, the front clamping body 19 sits on the corner E" of the one prismatic notch 28, while the rear clamping body 19' is set against the opposite edge of the shank polygon. The clamping body 19 fixes the screwdriver insert 22 in the position in which the end face of the same pointing inward bears against the permanent magnet 7.

In order to be able to remove the screwdriver inserts 20 to 22 from the chuck 1 in all the embodiments of the screwdriver inserts 20 to 22, the actuating sleeve 9 must be displaced in the arrow direction y, that is in the direction of the insertion side of the bush 5. As a result, the inclined surface 14 releases the clamping bodies 19, 19' when the respective screwdriver insert is pulled out in the radial outward direction, which permits removal of the screwdriver bit without hindrance.

What is claimed is:

1. A chuck for screwdriver inserts (20, 21, 22), having an insertion cavity (8) of a bush (5), the insertion cavity (8) being adapted in cross section to a polygonal section of an insertion shank (23) of a bit, defining a shank polygon, windows (16) opposite one another in a corner region of the insertion cavity (8) being located in the bush (5), and round clamping bodies (19, 19') lying in said windows (16) on supporting shoulders (18), the diameter of which clamping bodies (19, 19') is greater than window wall thickness and which are loaded inward toward the cavity by an inclined surface (14) of a spring-loaded actuating sleeve (9) and press in point contact against the corner of a corner recess of the insertion shank (23), wherein the clamping bodies (19, 19') are offset from one another in axial direction such that, in case of a corner recess in form of an annular flute (25), a rear of the clamping bodies (19') sits on the corner (E), and a front of the clamping bodies (19), lying on the supporting shoulders (18), projects freely into the annular flute (25), and, in case of a corner recess in form of a prismatic notch (28) or in form of a bevel (26), the front clamping body (19) sits on the corner (E', E") and the rear clamping body (19') bears against an edge of the shank polygon.

2. The chuck as claimed in claim 1, wherein both clamping bodies (19, 19') are subjected to pressure in radial direction by facing inclined surfaces (14) of the actuating sleeve (9).

3. The chuck as claimed in claim 1, wherein the clamping bodies (19, 19') are formed as balls.

* * * * *

UNITED STATES PATENT AND TRADEMARK OFFICE

CERTIFICATE OF CORRECTION

PATENT NO. : 6,311,989 B1

DATED : November 6, 2001

INVENTOR(S) : Sylvester Rosanwo

It is certified that error appears in the above-identified patent and that said Letters Patent is hereby corrected as shown below:

Title page,

Insert: -- [73] Assignee: Wera Werk Hermann Werner GmbH & CO., Wuppertal, Germany --.

Signed and Sealed this

Twelfth Day of November, 2002

*Attest:*

JAMES E. ROGAN

*Attesting Officer*

*Director of the United States Patent and Trademark Office*